Aug. 31, 1954 C. S. MORRISON 2,687,690
BALING PRESS PLUNGER AND SEPARATE KNIFE
Filed June 21, 1950
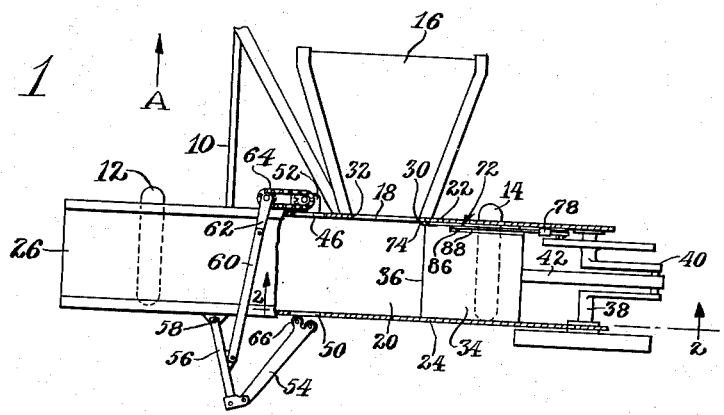
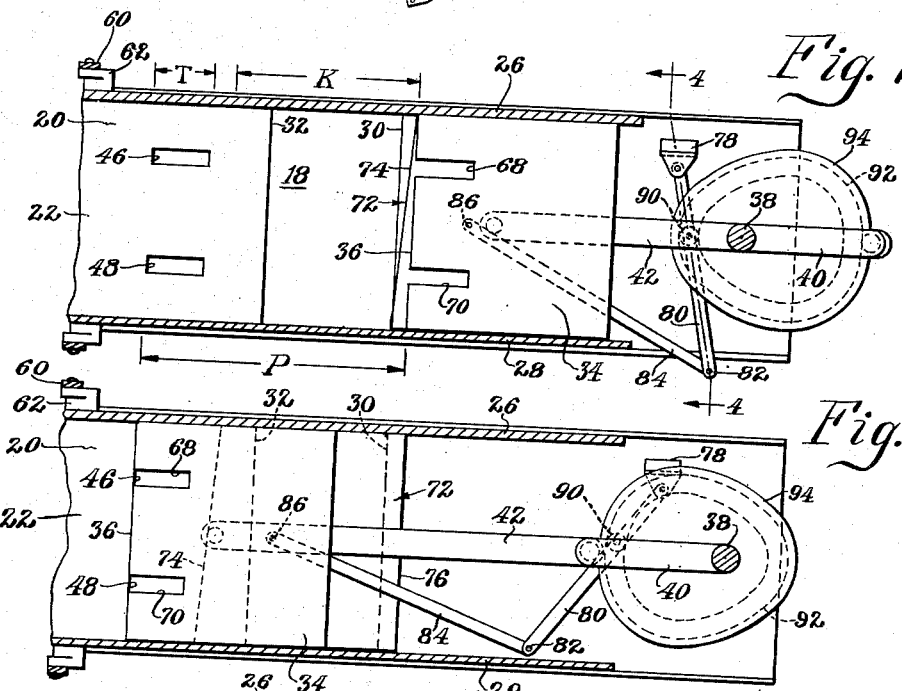
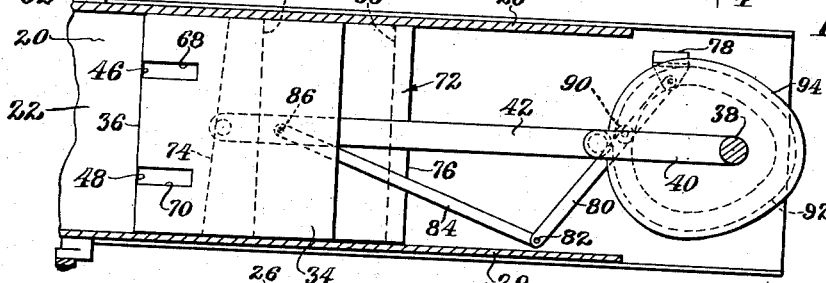
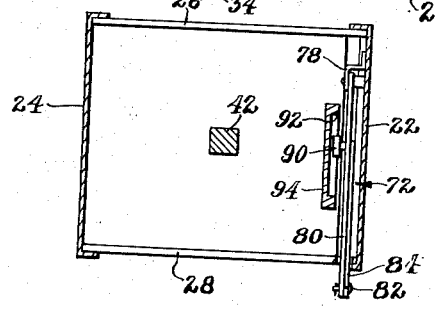
INVENTOR.
C. S. Morrison
BY
Attorneys Patented Aug. 31, 1954

2,687,690

UNITED STATES PATENT OFFICE 2,687,690

BALING PRESS PLUNGER AND SEPARATE KNIFE

Charles S. Morrison, Moline, Ill., assignor to Deere & Company, Moline, Ill., a corporation of Illinois Application June 21, 1950, Serial No. 169,405

1 Claim. (Cl. 100—98)

This invention relates to a baling press and more particularly to an auxiliary device such as a material-slicing knife releasably connected to the plunger of such press.

Although, as will be seen from the description to follow, the principles of the invention have relatively wide application, the herein disclosed form of the invention was designed primarily for use in balers of the pick-up type customarily employed on farms for the picking up and baling of hay, straw, etc. A typical baler of this character includes a mobile frame which may be drawn behind a tractor or vehicle or otherwise propelled over a field on which hay, straw, etc., is lying. The baler is equipped with pick-up mechanism for picking up the material from the ground and for delivering the material rearwardly through a feed opening into a bale chamber in which a baling plunger reciprocates to form the material into bales, the bales being successively tied and discharged at one end of the bale chamber. The bale chamber is normally made up of a plurality of walls arranged in such manner that the bale chamber is rectangular in section. One of the walls has a rectangular opening therein through which material is fed to be engaged by the leading or front face of the plunger as the plunger reciprocates. The stroke of the plunger on compression is such that the leading face of the plunger passes an edge portion of the opening along which material may be severed or sliced by virtue of a fixed knife along said edge portion and a cooperative knife carried by the plunger. The result is that a bale is made up of a plurality of charges each separated from the other because of the slicing or severing action occurring as the material is sheared between the fixed and reciprocating knives.

Some balers of the general character referred to are fully automatic; that is, they are provided with automatic tying mechanism which functions to tie a bale with wire or twine after the bale has attained a predetermined size, normally determined on the basis of length. A baler of this character will have its bale chamber provided with a feed opening in a vertical wall thereof. Hence, the shearing function of the knives will occur in the vertical plane of this wall. Further, since the baler is fully automatic, it is desirable to design the tying mechanism so that it will operate without requiring stoppage of the plunger. Typical tying mechanism includes one or more needles movable transversely of the bale case to bring a strand of twine or wire around the bale to the tying mechanism which is located on one wall of the bale chamber. Obviously, the needle must move through a portion of the zone in which the plunger moves on its compression stroke. The conflicting presence of the plunger and needle or needles in the same zone is resolved by providing the leading face of the plunger with slots or recesses to accommodate the needles. Hence, even though the needles are in tying position, the plunger may reciprocate without damaging the needles.

On the basis of a design such as that outlined above, it has heretofore been necessary to mount the needles for movement across the bale chamber in planes parallel to the plane of the wall in which the feed opening is formed. That is to say, if the feed opening is in a vertical wall, the needles move in vertical planes, normally from retracted positions below the bottom or floor of the bale chamber to tying positions projected upwardly through the bale chamber. The reason for this is that the plunger must be slotted to receive the needles in planes parallel to the wall in which the feed opening is provided, because the shearing edges of the knives must be continuous. That is, the knife on the plunger could not be slotted to accommodate the needles, for it would lose its shearing function with the fixed knife along the feed opening.

Although balers of the general design referred to above have been found quite satisfactory in the past, it is recognized that certain disadvantages result from the requirement that the needles be placed below the bale chamber to operate in the manner described. Among these disadvantages are increased height of the baler and the necessity for tying the bale across the shorter of its two transverse dimensions (the bale in section being a somewhat elongated rectangle rather than a perfect square). It has been determined that a better bale can be formed in a bale chamber having its shorter dimension horizontal, because the feeding mechanism that feeds material through the feed opening would then have to travel through a shorter path. However, this would necessitate mounting of the needles so that they move in horizontal planes. As stated above, such movement of the needles would be impossible because of interference with the knife.

According to the present invention, these desirable results are made possible by the provision of a knife that is carried separately from the plunger and driven by means that gives the knife a shorter stroke of reciprocation than the reciprocation stroke of the plunger, whereby as the plunger moves on its compression stroke well beyond the edge of the feed opening along which the cutting edge lies, the stroke of the separate knife will be such that it reaches its final position substantially upon occlusion with the cutting edge in a shearing zone considerably short of the zone or end position to which the plunger moves. Thus, the shearing or cutting edge of the knife may be made continuous and the knife will lose none of its efficiency. At the same time, the plunger may be slotted as usual to receive the tying needles. Yet, the slots may be provided in planes normal or perpendicular to the plane in which the knife operates. In short, the plunger may function with respect to its operation in connection with the needles during the tying operation just as if it had no knife thereon. Yet, a knife is provided that has all the functional characteristics of knives heretofore used for slicing material to provide separate charges.

Another important object of the invention is to provide for the driving of the plunger and knife by means deriving power from a common shaft. In particular, this shaft will be a crankshaft having a crank throw that is connected by a pitman to the plunger. In addition, the knife is preferably cam driven, the cam being designed and related to the crank throw so that the plunger and knife start together from a beginning position in which the feed opening is uncovered to different final positions in which the knife stops short of the zone into which the plunger moves. Still more particularly, the design of the cam and the relationship thereof to the crank throw is such that the knife precedes the leading edge of the plunger and attains its shearing position before the plunger reaches a position alongside the cutting edge at the feed opening. The cam is further designed so that the knife will be held substantially stationary after attaining its shearing status, while the plunger continues onward and subsequently returns on its retracting stroke, whereupon the knife and plunger again move in the direction in which the feed opening is uncovered.

The foregoing and other important objects and desirable features inherent in and encompassed by the invention will become apparent as a preferred embodiment of the invention is fully disclosed in the following detailed description and accompanying sheet of drawings in which:

Figure 1 is a plan view of a representative baler of the mobile pick-up type, a portion of the bale case being broken away to expose the plunger and its relationship to the feed opening;

Figure 2 is an enlarged fragmentary sectional view taken substantially on the line 2—2 of Figure 1, showing both the plunger and the knife in their retracted positions;

Figure 3 is a view similar to Figure 2 but showing the plunger and knife in their extended positions; and Figure 4 is a transverse sectional view taken substantially on the line 4—4 of Figure 2, the knife operating mechanism not being in section.

The pick-up baler chosen for the purposes of illustration comprises essentially a main frame 10 carried by wheels 12 and 14 for travel in the direction of the arrow A over a field from which windrowed hay or straw is picked up by pick-up mechanism 16 to be fed rearwardly through a feed opening 18 and into a bale chamber 20 provided within an elongated bale case of rectangular section made up by a plurality of walls, including front and rear walls 22 and 24 and top and bottom walls 26 and 28. In the present instance, the feed opening 18 is provided in the front wall 22 and is defined at its opposite sides by vertical edges 30 and 32 spaced apart lengthwise of the bale chamber 20.

A plunger 34 is carried for reciprocation lengthwise of the bale chamber 20 in alternate compression and retracting strokes, the plunger having a leading face 36 in front of which material is fed through the opening 18 to be compressed or compacted by the plunger on successive compression strokes. Figures 1 and 2 show the plunger in its retracted or starting position, the leading face 36 being substantially at or along the edge 30 of the feed opening 18. Hence, the feed opening 18 is uncovered. Figure 3 shows the final position of the plunger, it being noted that the leading face 36 moves to an end position well beyond the other edge 32 of the feed opening 18. Thus, the leading face of the plunger 34 travels through a fixed distance P (Figure 2). The means for reciprocating the plunger preferably comprises a crankshaft 38 journaled at one end of the bale chamber and having a single crank throw 40 that is pitman-connected at 42 to the plunger 34.

Material compacted by successive compression strokes of the plunger 34 is ultimately formed into bales and the bales are discharged at the open end of the chamber 20 opposite to the end at which the crankshaft 38 is carried. As the bales attain a predetermined length, they are tied by wire or twine. In the present representative disclosure, a wire-tying mechanism has been illustrated. This will be described briefly below.

The baler illustrated here differs primarily from balers heretofore known in that the tying mechanism has been rearranged on the basis of possibilities incident to certain aspects of the invention as will appear below.

Fundamentally, these changes involve rearrangement of the tying mechanism. Since the tying mechanism itself may be of any conventional or otherwise suitable design, only general disclosure is made here of the representative form adopted for present purposes. The details may be similar to the tying mechanisms shown in U. S. Patent 2,458,318 granted to M. H. Tuft, January 4, 1949, and U. S. Patent No. 2,456,476 granted to West et al., December 14, 1948.

The front wall 22 of the bale chamber 20 is provided with a pair of vertically spaced slots 46 and 48. The rear wall 24 is provided with a similar pair of slots, only the upper one of which is visible at 50 in Figure 1. The tying mechanism includes a gear housing 52 carried outside the front wall 22 and in communication with the slots 46 and 48. This housing contains suitable tying mechanism for cooperation with a pair of needles which move transversely of the bale case through the slots in the front and rear walls. Only one needle is shown in the drawings, but the presence of two will be apparent. The needle shown is designated by the numeral 54 and is mounted for swinging movement on an arm 56 pivoted at 58 to the rear wall 24 of the bale case. A connecting link 60 is connected to the arm 56 and to a crank arm 62 which is driven by suitable chain and sprocket mechanism 64 which in turn derives power from any suitable source.

The idle or retracted position of the needle 54 is that shown in Figure 1.

When the charges of material compacted by the plunger 34 obtain a predetermined length in the chamber, the needle 54 is moved forwardly through the alined slots, carrying by means of rollers 66 thereon a wire which is wrapped about the right-hand end of the bale and which is introduced through the slot 46 (48) to be tied by the mechanism (not shown) within the tying mechanism housing 52, after which the needle is retracted to its initial position. As shown in Figure 2, the tying zone in the chamber 20 occupies a space designated by the dimension T. It will be seen that this zone is within the zone of travel of the plunger 34. Since there are times when the needle 54 and plunger 34 will occupy the same portion of this over-lapping or common zone, provision must be made to prevent damage to the needle. For this purpose, the leading face of the plunger 34 is recessed or slotted at 68 and 70.

The construction and operation just described are largely conventional, with the exception that the knife usually carried by the plunger has been omitted from the plunger and, according to the present invention, is separately mounted. The reason for this, as explained above, is that a knife fixed to the plunger would travel with the plunger into the tying zone T and would have to be slotted like the plunger at 68 and 70 in order to accommodate the simultaneous presence of the needle. However, a slotted knife would lose much of its shearing efficiency. As will be set forth below, a more advantageous construction is provided by means of a separate knife.

The movable knife is designated generally by the numeral 72. This knife has a leading edge 74 and a trailing edge 76. The leading edge 74 is sharpened or otherwise provided as a knife or cutting element. The vertical edge 32 of the feed opening 18 is likewise provided as a cutting edge or cutting element.

The knife 72 is slidably interposed between the front wall 22 and the proximate side of the plunger 34 and is carried for reciprocation or movement back and forth from an idle or retracted position, as shown in Figures 1 and 2, to an extended or cutting position, as shown in Figure 3. In its cutting position, the cutting edge 74 of the knife moves slightly beyond the edge 32 of the feed opening 18. In other words, the edges 74 and 32 occlude. The limit of the movement of the knife is designated by the dimension K in Figure 1, wherein it will be seen that when the cutting edge 74 passes the cutting edge 32 it travels only slightly beyond the line of occlusion and terminates outside or short of the tying zone T. This result is made possible because of the separation of the knife from the plunger. Hence, although the plunger and knife move in parallel, the plunger has a considerably longer stroke than does the knife.

For the purposes of driving the knife in the limited stroke mentioned, driving means is provided, preferably connected to the crankshaft 38 that drives the plunger 34. Within the front wall 22 and adjacent the crankshaft 38, there is provided a pivot bracket 78 to which is pivoted the upper end of a depending lever 80. The lower end of the lever is pivotally connected at 82 to a short pitman 84 which has its other end pivotally connected at 86 to the knife 72. The front side of the plunger 34 is recessed at 88 (Figure 1) to accommodate this mechanism.

A roller 90 mounted on the lever 80 intermediate its ends follows a cam track 92 formed in a cam 94 fixed to the crankshaft 38 to rotate therewith. The cam 94 is so designed and so related with respect to the crank throw 40 of the crankshaft 38 that the leading edge 36 of the plunger 34 and the leading or cutting edge 74 of the knife 72 have substantially the same starting positions adjacent the vertical edge 30 of the feed opening 18, as shown in Figure 2. Further, the design of the cam and the relationship thereof to the crank throw 40 are such that the cutting edge 74 slightly precedes the leading face 36 of the plunger as the knife and plunger move in parallel toward the cutting edge 32 of the feed opening, whereby the material introduced through the feed opening 18 and into the bale chamber 20 will be sheared by occlusion of the cutting edges 74 and 32 and then will be carried farther to the left by the plunger 36, it being noted that the plunger travel P is considerably longer than the knife travel K. In other words, the plunger travel P exceeds knife travel K by at least the dimension T of the tying zone. Therefore, the leading edge 74 of the knife terminates short of the tying zone while the leading edge 36 of the plunger continues onward into the tying zone. Another factor in the design of the cam is that the knife 72 remains substantially stationary while the plunger continues into the tying zone. Thence, when the plunger returns on its retracting stroke, the two edges 36 and 74 again substantially coincide and the two move substantially simultaneously to the right to their initial positions, uncovering the feed opening 18.

The lever 80 and pitman 84 are utilized to obtain the necessary travel of the knife without materially increasing the size of the cam 94. However, on the basis of the fundamental concept taught here, other designs could be suitably worked out. Likewise, other modifications and alterations could be made in the preferred embodiment of the invention illustrated and described, all without departing from the spirit and scope of the invention as defined in the appended claims.

What is claimed is:

In a baler: a bale case including walls providing an elongated bale case, one of said walls having a feed opening including first and second edge portions spaced apart lengthwise of the bale chamber; tying mechanism on the bale case including a part movable across the bale case into a tying zone within the bale case and beyond said second edge portion, said one wall having an aperture therein beyond said second edge for receiving said tying mechanism part; a plunger carried for reciprocation lengthwise of the bale chamber in alternate compression and retracting strokes and having a leading material-engaging face movable on the compression stroke from a starting position adjacent the first edge of the feed opening to an end position beyond the second edge of the feed opening and into the tying zone, said face being recessed to accommodate the tying mechanism part; means at said second edge of the feed opening providing a cutting edge; a knife carried for movement back and forth across the feed opening in strokes materially shorter than the plunger strokes and between a starting position substantially coincident with the starting position of the plunger to a cutting position occluding with the cutting edge in a zone materially short of the aforesaid tying zone so as to stop before contact with the tying mechanism part; means for driving the plunger in its strokes of reciprocation; and drive means separate from the plunger and connected to the plunger drive means for driving the knife in time with the plunger so that the knife occludes with said cutting edge prior to attainment by the leading edge of the plunger of its end position on compression, said knife-driving means including a positive drive connection to the knife and independent of the plunger for limiting the stroke of the knife to the cutting zone and for returning the knife to its starting position.

References Cited in the file of this patent

UNITED STATES PATENTS

| Number | Name | Date |
| --- | --- | --- |
| 649,413 | Luzzato | May 8, 1900 |
| 810,998 | Thomas | Jan. 30, 1906 |
| 1,046,551 | Cass | Dec. 10, 1912 |
| 1,231,354 | Hilton | June 26, 1917 |
| 2,097,353 | Tallman et al. | Oct. 26, 1937 |
| 2,175,311 | Preston | Oct. 10, 1939 |
| 2,327,067 | Russell | Aug. 17, 1943 |